Dec. 23, 1941.   J. H. VAN UUM   2,267,512

TRIM MOLDING SECURING MEANS

Filed Feb. 11, 1941

INVENTOR.
JOHN H VAN UUM
BY *John H. Leonard Jr.*
HIS   ATTORNEY

Patented Dec. 23, 1941

2,267,512

UNITED STATES PATENT OFFICE 2,267,512

TRIM MOLDING SECURING MEANS

John H. Van Uum, Lakewood, Ohio

Application February 11, 1941, Serial No. 378,405

6 Claims. (Cl. 189—88)

This invention relates to spring fasteners such as are adapted for securing sheet metal trim members to apertured supporting structures, and to a combined sheet metal trim member and fastener member.

Sheet metal decorative trim molding members and spring fasteners demountably attached to the trim molding members for attaching the latter to various supports are commonly used, a common use being to attach decorative metal trim to automobile bodies, fenders, metal furniture, etc. The sheet metal trim molding members usually are channel-shaped with oppositely disposed inturned flanges at the open side. Each of the spring fasteners has a head portion adapted to be accommodated in the trim member and to overlie both flanges interiorly and a shank portion disposed more or less centrally of the head portion and adapted to extend out of the open side of the trim member for engagement with an aperture in the supporting structure.

An example of such a molding and fastener combination is shown in my U. S. Patent No. 2,221,009, issued November 12, 1940, wherein the fastener is of the same general type as the fastener of the present invention. As there described, the fastener comprises a one piece spring wire member having a shank in the form of a compressible and expansible loop of the wire with its loop terminal portions relatively crossed adjacent the head from which arms of the head extend generally in opposite directions and carry mutually parallel arm elements for engagement with the trim flanges. The shank is compressed as it is forced into an aperture in a supporting structure such as an automobile body, fender or panel, and then expands so as to engage the edges of the aperture and thereby holds the trim firmly in place on the supporting structure. The oppositely extending arms of the head slope toward the plane of the supporting structure from the region of the loop terminal portion mentioned above, for the purpose of distributing the holding force of the fastener to the two mutually parallel arm elements of the head and applying the holding force of each arm element to respective flanges of the trim molding.

The head of a fastener made such as above described is diminished in lateral overall extent in a plane parallel to the support by lateral expansion of the shank loop in its principal plane for purposes of insertion of the head into the trim channels and is increased in overall lateral extent by release of the shank, whereupon the arm elements snugly engage the inner walls of the trim molding. This enables the mounting of a series of fasteners in a trim molding in such spaced relation to each other that the shanks of the fasteners are properly positioned for engagement with respective ones of a series of apertures in the main support, and assures maintenance of the fasteners snugly in mounted position so that they cannot be easily displaced. For the above purpose the parallel arm elements of the head and the supporting arms of said elements are so proportioned with respect to the trim molding that the mutually parallel arm elements press so snugly against opposite inner wall surfaces of the trim molding when the shanks are released that considerable pressure must be applied on the trim molding in order to force the shanks into the apertures of the support. Thus the snug fitting of the heads in the trim molding augments the force exerted by the spring stock of the shank on the walls of the aperture of the support when the assembly is completed and maintains the shanks firmly in place in the supporting structure.

When the trim molding is made as a fairly shallow but wide channel and of comparatively thin sheet stock, and the laterally directed portions of the head slope toward the main support as mentioned above, there is frequently only a little more than sufficient height at the lateral mid-region of the channel to accommodate the portion of the head of the fastener which lies immediately adjacent the shank, particularly the loop terminal portion of the shank where the wire stock is crossed. Due to the sloping of the laterally directed elements of the head, the central portion of the head is in effect a relatively non-yielding hump. Consequently, since the pressure required to insert the shanks is considerable, particularly because the lateral pressure of the head is increased by contraction of the shank as it passes through the aperture in the support, and the most natural point at which to concentrate the required pressure for insertion of the shank is over the fastener, there is always danger of springing the relatively weak web of the trim molding toward the support a sufficient amount to cause it to engage the relatively non-yielding hump portion of the head and to be indented from the inner side thereby, thus causing a permanent unsightly bulge on the outer exposed surface of the trim molding. The danger of so distorting the trim molding is greatest when the web or central main portion of the trim is not arched substantially for resisting flexing thereof toward the main support, and when one side marginal portion of the trim molding has sufficient height so that the head portion of the fastener which lies in the relatively high portion ordinarily could move relative to the trim in a direction toward and away from the main support. The accompanying drawing shows that type of trim molding.

One object of the present invention is to provide a spring or snap fastener with means operating to reinforce sheet metal trim channels adapted for use therewith, when the channel shape is such that the head portion of the fastener has little or no clearance between it and an adjacent web portion of the channel and when the channel shape and strength are such that the web can be flexed by the localized pressure which must be applied thereon for mounting the trim molding on the support.

Another object is to provide a snap or spring fastener made in one piece from spring wire stock and configured to reinforce a relatively wide, shallow trim molding of light gage, with which the fastener is associated, in a manner to prevent distortion of the sheet metal by the force applied in mounting the trim molding on a support by pressure applied to the outer surface of the trim molding.

A further object is to provide a unit comprising a light gage, relatively wide and shallow molding strip and relatively stiff spring wire fastener, which unit is capable of being applied to a rigid support under considerable pressure and with no great degree of care without danger of distorting the metal of the molding strip.

Other objects and features of the invention will become apparent from the following description of a preferred embodiment shown in the accompanying drawing, in which—

Figure 1:
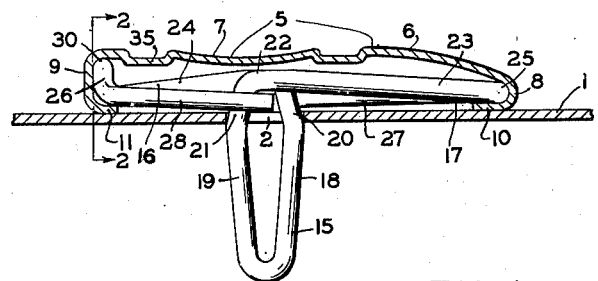
Fig. 1 is a fragmentary sectional view of an apertured supporting plate or sheet and an illustrative trim molding secured to the supporting plate or sheet by a fastener made in accordance herewith, and shown in elevation.

A main support may comprise a sheet metal plate or panel 1, a small section of which is shown with an aperture 2 therethrough.

The trim molding, as shown, comprises a sheet metal strip having a web portion 5 which at one side of the strip is of flattened arch form, as at 6, the web portion 5 being slightly concave beyond the mid-region, as at 7. The side walls of the channel differ in that the side wall adjacent the portion 6 is formed on a short radius, as at 8, and the opposite side wall 9 is considerably higher and extends approximately at right angles to the web 5. The edge margins of the strip of which the molding is formed are turned inwardly to form parallel inturned flanges 10 and 11 which lie in the same plane. Thus the trim molding is a generally flat or shallow channel higher at one side than the other and with inturned flanges adapted to be pressed against the supporting sheet or plate 1. Since the stock of the molding is fairly thin, for example, in the neighborhood of .030", the web can be sprung fairly easily a considerable distance toward the support 1 by the pressure required for installation.

Figure 3:
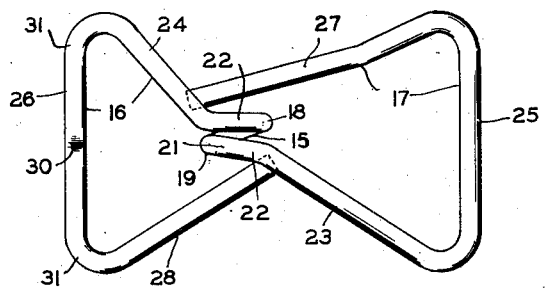
Fig. 3 is a plan view of the fastener.

The fastener is formed from a single piece of wire and comprises a loop 15 which forms the shank, and head elements 16 and 17 each of which is of generally triangular form as shown in Fig. 3. The loop 15 has spaced legs 18 and 19, the upper portions of which diverge away from the head and then converge, thereby defining locking shoulders 20 and 21 for engagement with the edges of the aperture 2. The upper extremity of the loop 15 is formed by relatively crossed portions 22 of the legs, and arm portions 23 and 24 of respective triangular head elements extend laterally from the relatively crossed portions, contiguous therewith respectively, and slope downwardly at a slight angle toward the support from the effective upper end of the shank. Thus the "hump" effect of the central part of the fastener is constituted by the upper end of the shank and immediately adjacent portions of the head. At the outer ends of the arms 23 and 24 the wire is bent to form mutually parallel arm portions 25 and 26 which lie over the flanges 10 and 11, respectively, and press them against the support when the shank is in locking engagement with the support as illustrated in Fig. 1. Beyond the parallel portions 25 and 26 the extremities of the wire may extend toward the shank, as at 27 and 28, the portions 23, 25 and 27 thus constituting one triangular head element and the portions 24, 26 and 28 constituting the other. The various elements comprising the head and shank of the fastener are so proportioned with respect to the inner marginal portions of the trim molding and the aperture 2, respectively, that the parallel portions 25 and 26 of the head elements tightly engage the walls 8 and 9 of the trim channel when the locking shoulders 20 and 21 of the shank are pressed tightly against opposite edges of the aperture 2.

The spring stock has to be fairly stiff and preferably relatively large diameter wire in order to provide in a fastener designed as above sufficient strength to hold relatively wide and shallow trim molding in place on or relative to the support 1, and the snug fitting engagement of the parallel portions 25 and 26 of the head with the side walls of the trim channel and the reversed relationship of head elements and the legs of the shank prevents any great degree of flexibility, or contractibility, at the locking shoulder portions of the shank-forming loop 15. Also, during insertion of the widest part of the shank into the aperture, as necessary for the locking shoulders 20 and 21 to pass beyond the aperture walls, a considerable pressure must be exerted on the trim molding. The "hump" constituted by the connecting portions of the head elements and shank, such as the crossing portions 22, has almost no head room within the trim molding. Hence there is danger of outwardly indenting the web of a fairly wide but shallow channel having no substantial stiffening arch effect and made of light gage stock when the channel, with the fasteners mounted therein, is pressed onto the main support with sufficient force to cause the forcing of the fastener shanks into the respective apertures.

The likelihood of indenting or deforming such channel, as above discussed, can be greatly reduced or entirely eliminated by so forming the portion 26 of the head element 16 that this portion extends from the web to the flange 11 and cannot move freely in the relatively high part of the channel in a direction toward and away from the support 1, or parallel to the wall 9 of the channel. Moreover, if the portion 26 is somewhat yieldingly prevented from such movement, there will then be little likelihood of distorting the portion of the web which lies over the portion 26 of the head.

Figure 2:
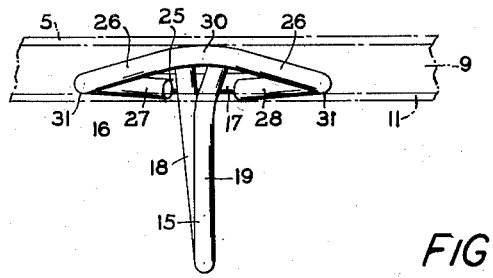
Fig. 2 is a side elevation of the fastener taken at right angles to Fig. 1 and showing diagrammatically the relationship of part of the trim molding to a head portion of the fastener.

The present solution to the problems indicated above includes, as illustrated particularly by Fig. 2, the upward bowing of the arm portion 26 of the head element 16, as at 30, between regions or points 31 of said portion 26 which bear on the flange 11. Specifically the arm portion 26 is bowed upwardly at 30 a sufficient distance above the flange-contacting points 31 to make snug yielding contact with the web of the channel intermediately of points or regions 31 which bear on said flange 11. In order substantially to balance the forces applied at 31 by the arm portion 26 on the flange 11 while obtaining snug yielding contact between the portion 26 and the web of the trim molding, the upward bow 30 in the arm portion 26 has its center of upward pressure approximately midway between the points or regions 31.

By bowing the portion 26 upwardly on a relatively long radius or as a gradual curve abrupt bends in the wire stock are avoided and the upward pressure of the region 30 on the web of the channel arising incident to forcing the trim and fasteners toward and into the support is distributed somewhat along the trim rather than being concentrated at one point.

Additionally, the gradual curve of the bow in the arm portion 26 assists in mounting the fasteners in the trim molding and in removing the fasteners if necessary, particularly when the space into which the portion 26 must be inserted has a restricted entrance, or the opening between flanges 10 and 11 is limited so as not to afford as much manipulation of the fastener as would be necessary were the arm 26 in engagement with the web over a greater portion of its length. The former is true of the trim section illustrated in Fig. 1 and which has an indentation 35 extending lengthwise and forming a rib inside the trim operating to restrict the entrance to the space occupied by the portion 26 of the fastener. The gradual curve of the bow 30 enables the portion 26 more readily to be rotated into and out of position, for example, by rotation around the longitudinal axis of the shank of the fastener. The gradually curved bow acts as a cam in being moved past the rib 35 into or out of the position in which shown and thus renders insertion and removal of the fastener easier.

The above described arrangement preserves the headroom above the humped central part of the fastener and, due to the laterally outward pressure of the head portions 25 and 26 on the side walls of the channel, the web 5 is maintained in tension transversely of the molding strip, so that the portion of the web which lies over the hump will remain in spaced relation thereto notwithstanding localized or concentrated downward pressure on the web close to the fastener, as slightly off center with reference thereto in any direction. The portions 30 and 31 result in a direct transfer of installing force from the outer surface of the trim molding to the clip, thus protecting the trim molding from damage and distortion.

I claim:

1. A spring fastener adapted for attaching to a supporting structure a molding trim channel having inturned flanges, said fastener having an expansible and contractible shank adapted for forced engagement with the supporting structure at an aperture therein and a head with oppositely extending elements arranged to occupy the channel and to press respective flanges toward the supporting structure, one of said head elements having an elongated resilient portion so disposed as to extend along the flange in the mounted position of the molding, said elongated portion having three trim-contacting regions spaced apart from each other along the axis of elongation of said portion, two of said regions being located near the effective ends of said portion and disposed for engagement with one surface of the trim and the third being located between the effective ends of said portion and disposed for engagement with a surface of the trim lying opposite the surface engaged by said two regions and parallel thereto, said third trim-contacting region being spaced from the other trim contacting regions transversely of said axis of elongation a sufficient distance so that said elongated portion can make contact with such parallel surfaces of the trim only at said three regions.

2. A one piece spring wire fastener having a contractible shank in the form of a loop adapted to be forced into an aperture of a support and a head comprising laterally extending arm elements connected with the shank and adapted to press opposite inturned flanges of a channel shaped trim molding section toward the support when the shank is in such aperture, one of the arm elements including a portion of the wire adapted to extend along one flange of the molding, said portion being bent in a plane substantially perpendicular to the principal plane of the flange so as to make contact with the flange at spaced regions lengthwise thereof and of said portion, and so as to dispose a part of said portion lying between the aforesaid regions so that the wire thereof is out of contact with the flange and can bear against an inner wall surface of the molding in spaced relation to the flange and a greater distance therefrom than the diameter of the wire.

3. A one piece spring wire fastener having a contractible shank in the form of a loop adapted to be forced into an aperture of a support and laterally extending arm elements connected with the shank and adapted to press opposite inturned flanges of a channel shaped trim molding section toward the support when the shank is in such aperture, one of the arm elements comprising a portion of the wire adapted to extend along one flange of the molding, said portion being bowed on a gradual curve between its ends so that the end regions can make contact with the flange at spaced regions lengthwise thereof and of said portion, an intermediate region of the bowed portion being spaced a substantial distance from said end regions in the plane of the bow and perpendicular to the flange so as to bear against an inner wall surface of the molding generally parallel to the flange and in spaced relation thereto.

4. In a combination comprising a light gage and relatively shallow trim molding channel having a web and inturned flanges and a side wall of substantial height connecting the web with one of the flanges, and a spring fastener having head elements overlying the flanges, a contractible shank adapted to be forced into an aperture of a support and connecting means for the shank and head elements, the connecting means of the fastener lying close to an upper inner wall surface of the web; the arrangement wherein the head element which overlies the flange associated with said wall has portions spaced apart from each other along said flange, one bearing yieldingly on the flange toward said support and another bearing yieldingly on an inner surface of the web adjacent said wall.

5. In combination with a trim molding channel of light gage sheet stock, said channel having a relatively broad web of generally flat form, inwardly turned flanges lying in the same plane and side walls connecting the web with respective flanges; a spring fastener mounted on the molding and having a head lying within the channel in contact with the flanges and a shank extending out of the channel between the flanges for forced engagement with a support at an aperture therein, said shank consisting of a piece of wire in the form of a loop, the principal plane of which is transverse to the channel, free terminal portions of the loop lying within the channel close to the web thereof and being relatively crossed and the head comprising continuations of said crossed free terminal portions, which continuations extend generally in opposite directions toward the side walls and then respectively along and in contact with the side walls, the portion of one of the continuations which extends along a side wall being bent in a plane parallel to said side wall so as to bear concurrently on the adjacent flange and the web at regions spaced apart longitudinally of the molding channel.

6. In combination with a trim molding channel of light gage sheet stock, said channel having a relatively broad web of generally flat form, inwardly turned flanges lying in the same plane and side walls connecting the web with respective flanges; a spring fastener mounted on the molding and having a head lying within the channel in contact with the flanges and a shank extending out of the channel between the flanges for forced engagement with a support at an aperture therein, said shank consisting of a piece of wire in the form of a loop, the principal plane of which is transverse to the channel, free terminal portions of the loop lying within the channel close to the web thereof and being relatively crossed and the head comprising continuations of said crossed free terminal portions, which continuations extend generally in opposite directions toward the side walls and then respectively along and in contact with the side walls, the portion of one of the continuations which extends along a side wall being bowed in a plane parallel to said side wall so as to bear on the adjacent flange at regions spaced apart longitudinally of the molding channel and to bear on the web in spaced relation to the aforesaid regions longitudinally of the channel.

JOHN H. VAN UUM.